United States Patent [19]
Benjamin et al.

[11] 3,743,307
[45] July 3, 1973

[54] SPRING ACTUATED CHUCK

[75] Inventors: Milton L. Benjamin; Wilbur N. Miles, both of Chagrin Falls, Ohio

[73] Assignee: Erickson Tool Company, Solon, Ohio

[22] Filed: July 15, 1971

[21] Appl. No.: 162,850

[52] U.S. Cl. .................................................. 279/91
[51] Int. Cl. ............................................ B23b 31/10
[58] Field of Search .................. 279/91, 90, 89, 1 B

[56] References Cited
UNITED STATES PATENTS
3,512,793  5/1970  Botimer ............................ 279/91
3,529,843  9/1970  Benjamin et al. ................. 279/91

*Primary Examiner*—Gil Weidenfeld
*Attorney*—Oberlin, Maky, Donnelly & Renner

[57] ABSTRACT

A spring actuated chuck wherein a slotted flange, tapered shank tool mounting member is clamped to a holder by a spring actuated clamping and releasing nut assembly which includes a nut member having threaded engagement with the holder, a clamping and releasing ring having clamping and releasing lugs to engage opposite sides of the flange of the tool mounting member thus to clamp the tool mounting member to the holder and to release the tool mounting member from the holder upon turning of the nut assembly in opposite directions, and a latch member which releases said nut assembly for spring actuated clamping movement upon insertion of the shank of the tool mounting member into a socket in the holder.

1 Claim, 3 Drawing Figures

PATENTED JUL 3 1973 3,743,307

INVENTORS
MILTON L. BENJAMIN
WILBUR N. MILES

Oberlin, Maky, Donnelly & Renner
ATTORNEYS

SPRING ACTUATED CHUCK

BACKGROUND OF THE INVENTION

It is known as disclosed for example in the Milton L. Benjamin et al. U. S. Pat. No. 3,529,843, dated Sept. 22, 1970, to provide a quick change chuck in which the clamping and releasing nut assembly aforesaid is manually rotated in opposite directions respectively to non-rotatably clamp a flanged tool mounting member to a holder and to release said member from said holder. In the case of a vertical spindle machine tool, the clamping operation requires the use of both hands of the operator, one to stab the shank of the tool mounting member into the socket of the holder in the spindle, and the other to turn the nut assembly in clamping direction.

SUMMARY OF THE INVENTION

Contrary to the foregoing, the chuck herein is provided with a spring actuated clamping nut which is released for rotation in clamping direction upon movement of the tapered shank of the tool mounting member into the socket of the holder, such movement being effective to release a latch member from said clamping nut whereby the clamping operation is a one hand operation involving only the stabbing of the tapered shank of the tool mounting member into the socket of the holder.

DISCUSSION OF THE INVENTION

Figure 2:
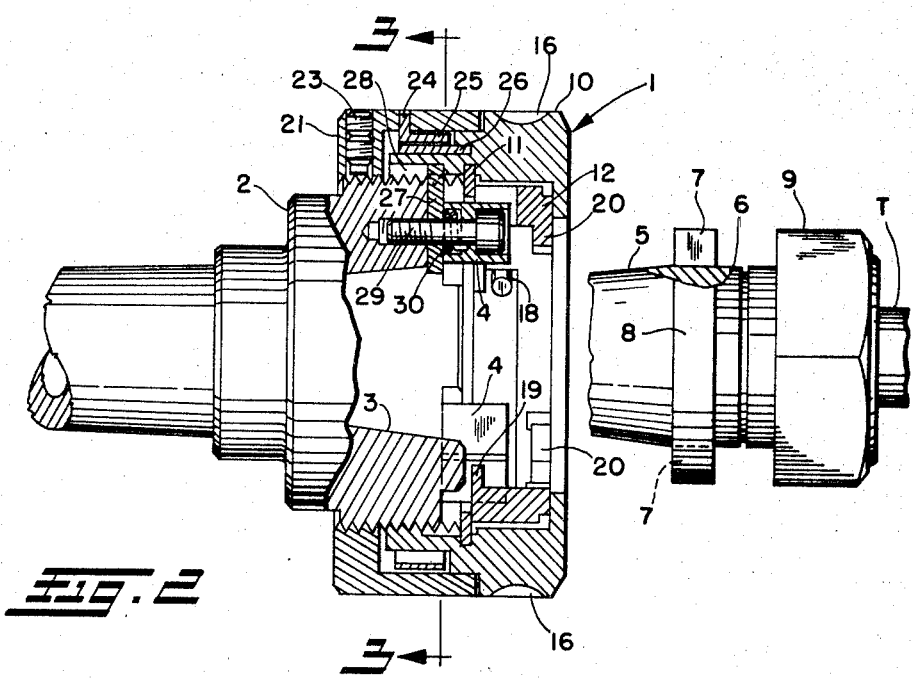
FIG. 2 is a cross-section view of the FIG. 1 holder taken along line 2—2, FIG. 1 ready to receive therein a tapered shank, slotted flange tool mounting member.

As shown in the drawing, the chuck 1 herein comprises a holder 2 which is adapted to be secured to a spindle of a milling machine, boring mill, drill press, or the like, or fashioned to be mounted to, for example, a lathe turret. The end of the holder 2 is provided with a tapered socket 3 and a pair of axially extending keys 4, the socket 3 being adapted to receive the correspondingly tapered shank 5 of a tool mounting member 6, and the keys 4 being adapted to extend axially into the slots 7 of the flange 8 of the tool mounting member 6, thus to hold the latter against rotation with respect to the holder 2.

The tool mounting member 6 is herein shown as having a collet chuck 9 adapted to hold a drill, a reamer, or like tool T. It is to be understood that the tool mounting member 6 may be fashioned for mounting an end mill, a shell and face mill, a boring head, a tapered shank drill or the like.

In screw threaded engagement with the holder 2 is a nut member 10 in which is held, by a snap ring 11, a clamping and releasing ring 12 which is frictionally engaged with the nut member 10 to rotate in unison therewith during the initial turning of the nut member 10 in clamping direction by one or more spring press plungers 14 which engage the wall of the nut member 10 bore.

The nut member 10 has a series of circumferentially spaced depressions 16, one pair of diametrically opposite ones of which are adapted to be painted a bright color so that when the chuck 1 is in position for insertion of a tool mounting member 6 the painted depressions 16 will denote the location of the keys 4 which may be difficult to see by the operator as when the holder 2 is attached to a vertical spindle. Extending radially inward into the nut member 10 is a stop screw 18 which engages one side of a releasing lug 19 of the ring 12 to move the ring 12 in a counterclockwise direction to a stop position whereat the opposite sides of said releasing lugs 19 are engaged with one side of said keys 4 as best shown in FIG. 2.

The clamping and releasing ring 12 has a pair of clamping lugs 20 circumferentially and axially offset from said releasing lugs 19 and adapted to engage the axially outer surface of the slotted flange 8 of the tool mounting member 6 when the latter is inserted in said holder 2 to thereby seat the shank 5 in the socket 3. As aforesaid said ring 12 has a pair of releasing or ejecting lugs 19 which are adapted to engage the axially inner surface of the flange 8 thus to release or pull out the tapered shank 5 from the tapered socket 3 of the holder 2.

Figure 3:
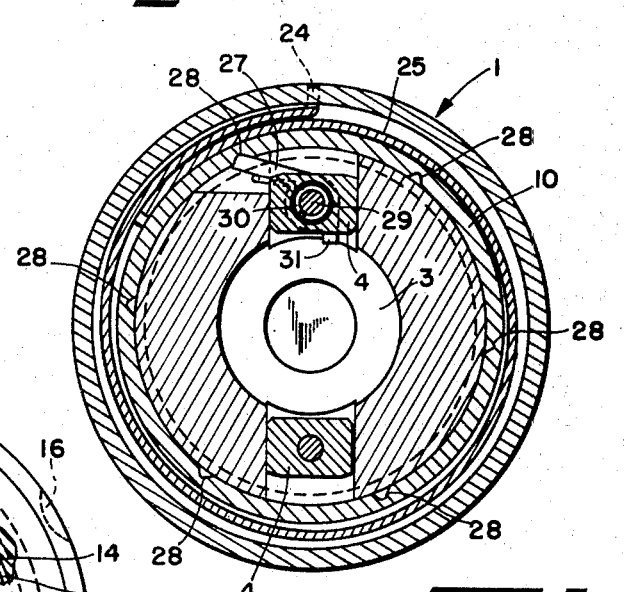
FIG. 3 is a cross-section view taken substantially along the line 3—3, FIG. 2.
Figure 1:
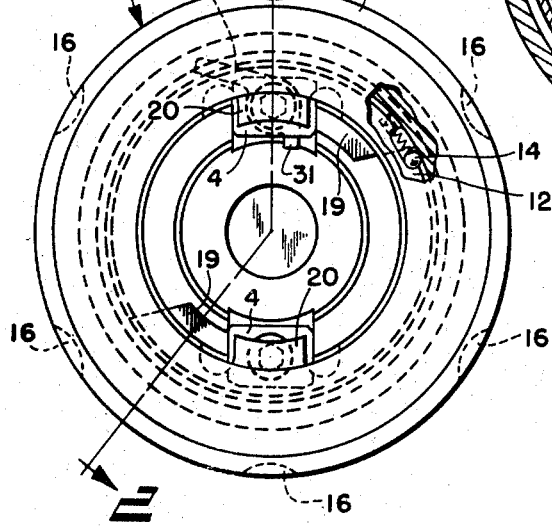
FIG. 1 is an end elevation view of the holder as viewed from the right-hand end of FIG. 2 with a portion of the nut broken away to show friction means to cause initial rotation of the nut and clamping and releasing ring in unison.

Adjustably screwed onto the holder 2 is a ring member 21 which is locked in adjusted position as by set screws 23, said ring member 21 serving to anchor as at 24 one end of a spiral spring 25 as best shown in FIGS. 2 and 3. The other end of the spring 25 is anchored to the nut member 10 as at 26. In FIG. 3 the spring 25 is wound up to rotate the nut member 10 in clockwise clamping direction upon release of the latch member 27 from the notch 28, the latch member 27 being pivotally mounted on the key mounting screw 29 and being urged by torsion spring 30 to the latched FIG. 3 position. The latch member 27 has an inner portion 31 which extends radially inward of the wall of the tapered socket 3 so that the tapered shank 5, when inserted into the socket 3, will actuate the latch member 27 to disengage it from the notch 28 thus to release the nut member 10 for rotation in clamping direction under the influence of the spring 25. Additional notches 28 are provided at 60° intervals to enable adjustment of the nut member 10 so that during part turn rotation, the clamping lugs 20 will engage the flange 8.

In operation, as the nut member 10 is manually turned to its extreme counterclockwise latched position as viewed in FIG. 2, the spring 25 is wound up and the end of the stop screw 18 engages one side of an ejecting lug 19 to cause both ejecting lugs 19 to contact one side of said keys 4. In this position of said ring 12, the clamping lugs 20 are aligned with the keys 4 and thus the slotted flange 8 of a tool mounting member 6 may be axially inserted so that the keys 4 extend into the slots 7 and so that the axially inner face of the flange 8 is engaged with the ledges of the releasing or ejector lugs 19, the tapered shank 5 being out of engagement with the tapered socket 3 of the holder 2 but being in engagement with the latch member 27 to disengage it from the notch 28. At this time, with the tool mounting member 6 inserted, the axially inner faces of the clamping lugs 20 are outwardly spaced from the axially outer face of the flange 8 whereby as the released clamping nut member 10 is now turned by the spring 25 in a clockwise direction as viewed in FIG. 2, the clamping and releasing ring 12 will turn therewith in unison, and, as the turning of the nut member 10 continues the inner faces of the clamping lugs 20 will engage the axially outer end face of the flange 8 to press the tapered shank 5 into seating engagement in the tapered socket 3 and, of course, as the nut member 10 is turned the releasing lugs 19 are moved axially away from the axially inner face of the flange 8.

When it is desired to release the tool mounting member 6, the nut member 10 will be manually turned in a counterclockwise direction and when the screw 18 engages one side of one of the releasing lugs 19 the clamping and releasing ring 12 will be turned in unison with the nut until the releasing lugs 19 engage one side of the keys 4 as shown in FIG. 2 at which time the clamping lugs 20 are aligned with the keys 4. During this counterclockwise rotation, the releasing or ejector lugs 19 engage the axially inner face of the flange 8 to release the shank 5 from the socket 3 and when the shank 5 is withdrawn the latch member 27 will re-engage the notch 28.

If it be desired to use the nut assembly 10, 11, 12 with another holder 2, or in the event of wear of the flange 8 or of the clamping and ejecting lugs 20 and 19, the screw 18 may be removed and the nut member 10 turned until desired clamping and ejecting action is achieved. The screw 18 is then reinserted in another hole so that screw 18 engages one releasing lug 19 at the stop position whereat both lugs 19 engage the respective keys 4. It can be seen that in the present case when six equally spaced holes are provided, adjustment can be made in one-sixth turn (60°) intervals to achieve desired clamping and releasing within a part turn rotation of the nut member in opposite directions.

In the present case, the maximum rotation of ring 12 in the clamping direction is limited to an angle of about 90° from the FIG. 2 position, i.e., until the lower edge of upper lug 19 engages the right hand side of lower key 4 and the upper edge of lower lug 19 engages the left hand side of upper key 4. The rotation of nut member 10 by the spring 25 may be continued thereafter with the stop screw 18 passing the lower key 4 until it engages the then lower side of lug 19 which is engaged with the upper key 4.

We, therefore, particularly point out and distinctly claim as our invention:

1. In a chuck of the type wherein a holder has a socket to receive the shank of a flanged tool mounting member and a pair of keys secured by screw means to said holder to axially interfit slots in the flange of said member, the improvement which comprises a nut having threaded engagement with said holder and having an opening for passage of said flange therethrough; said nut having radially inwardly extending clamping lugs to engage the axially outer face of said flange upon rotation and axial inward movement of said nut thus to clamp said member in said holder; spring means acting on said nut to rotate said nut as aforesaid; and latch means actuated upon insertion of said shank into said socket to release said nut for rotation by said spring means; said latch means comprising a latch member pivotally mounted on one of said screw means and having an inner portion actuated radially outward by said shank to move an outer portion thereof radially inward out of engagement with a notch in said nut thus to release said nut for rotation by said spring means; and another spring means acting on said latch member to re-engage said outer portion with said notch upon manual rotation of said nut in the opposite direction against said spring means and upon withdrawal movement of said shank from said socket.

* * * * *